Figure 18:
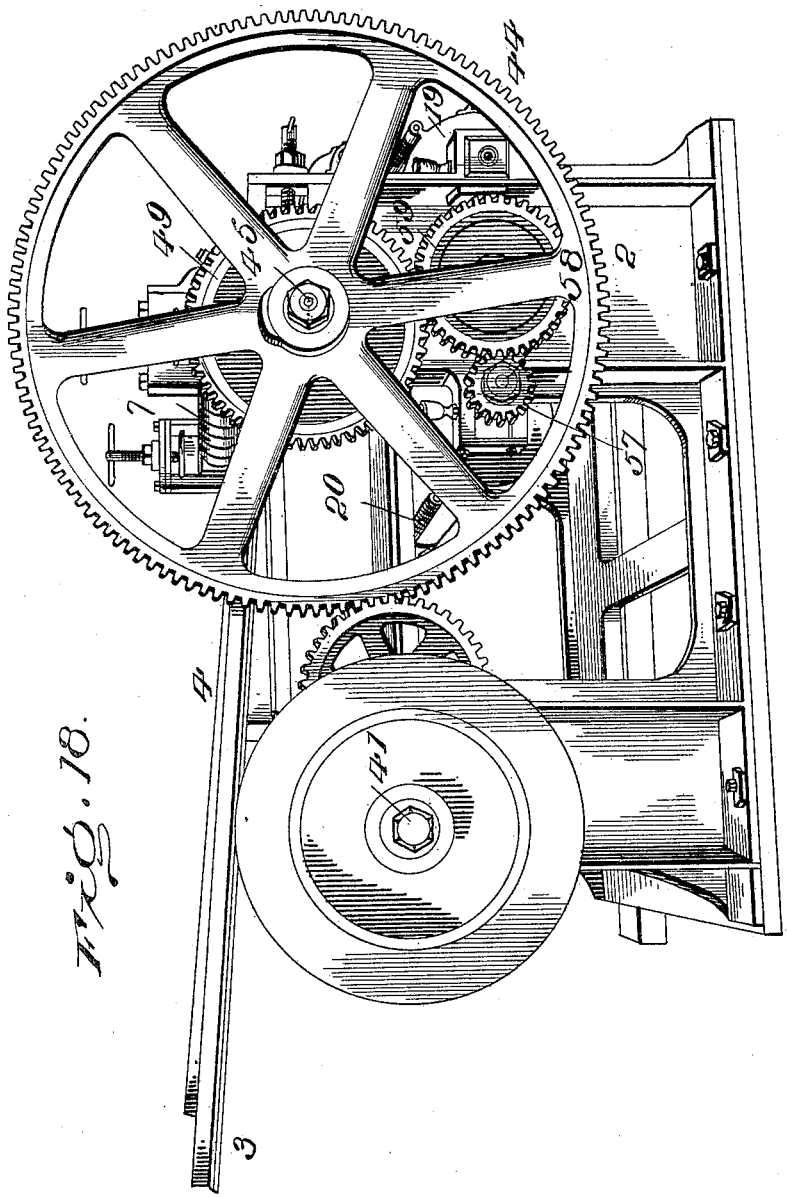

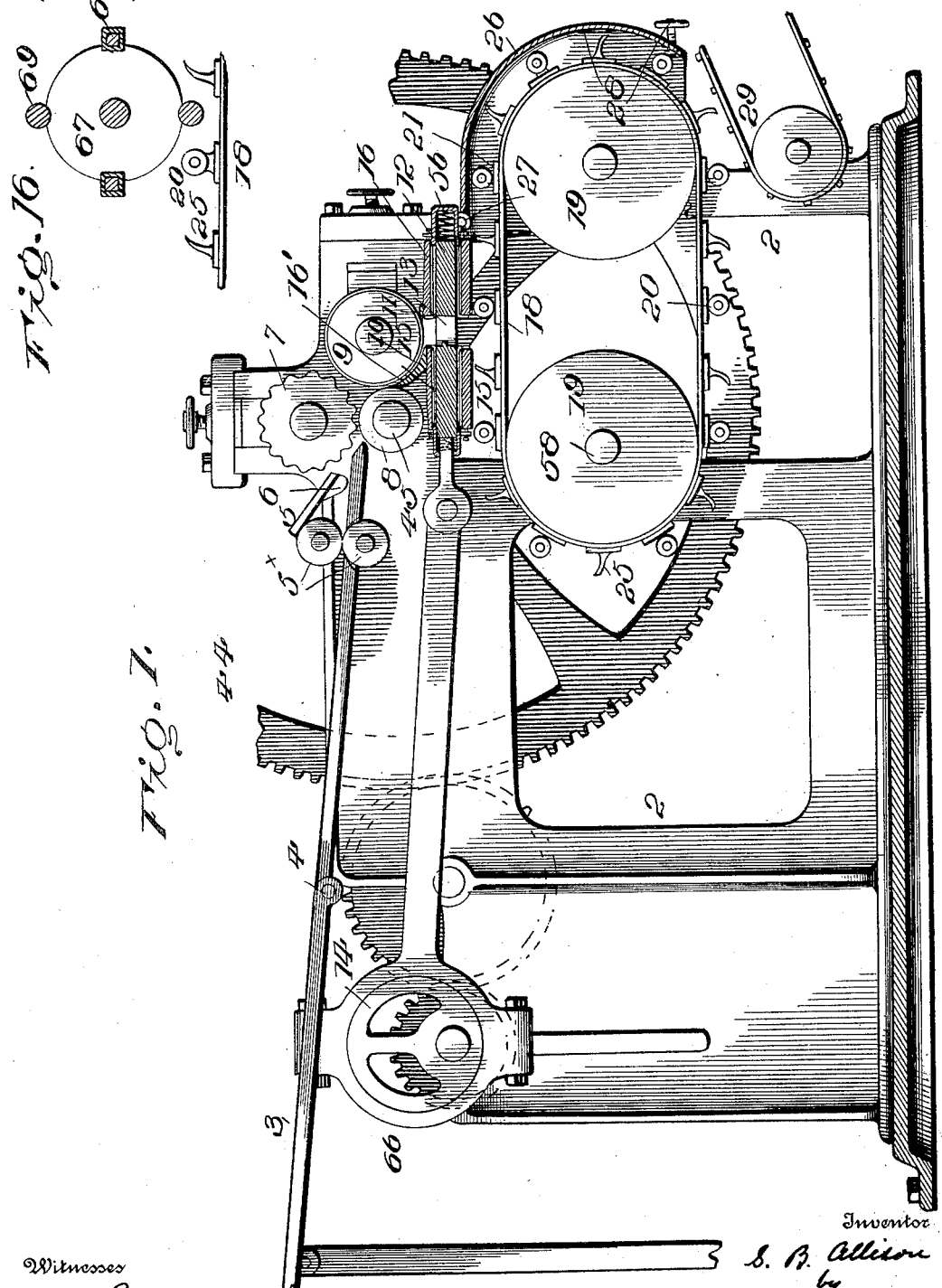

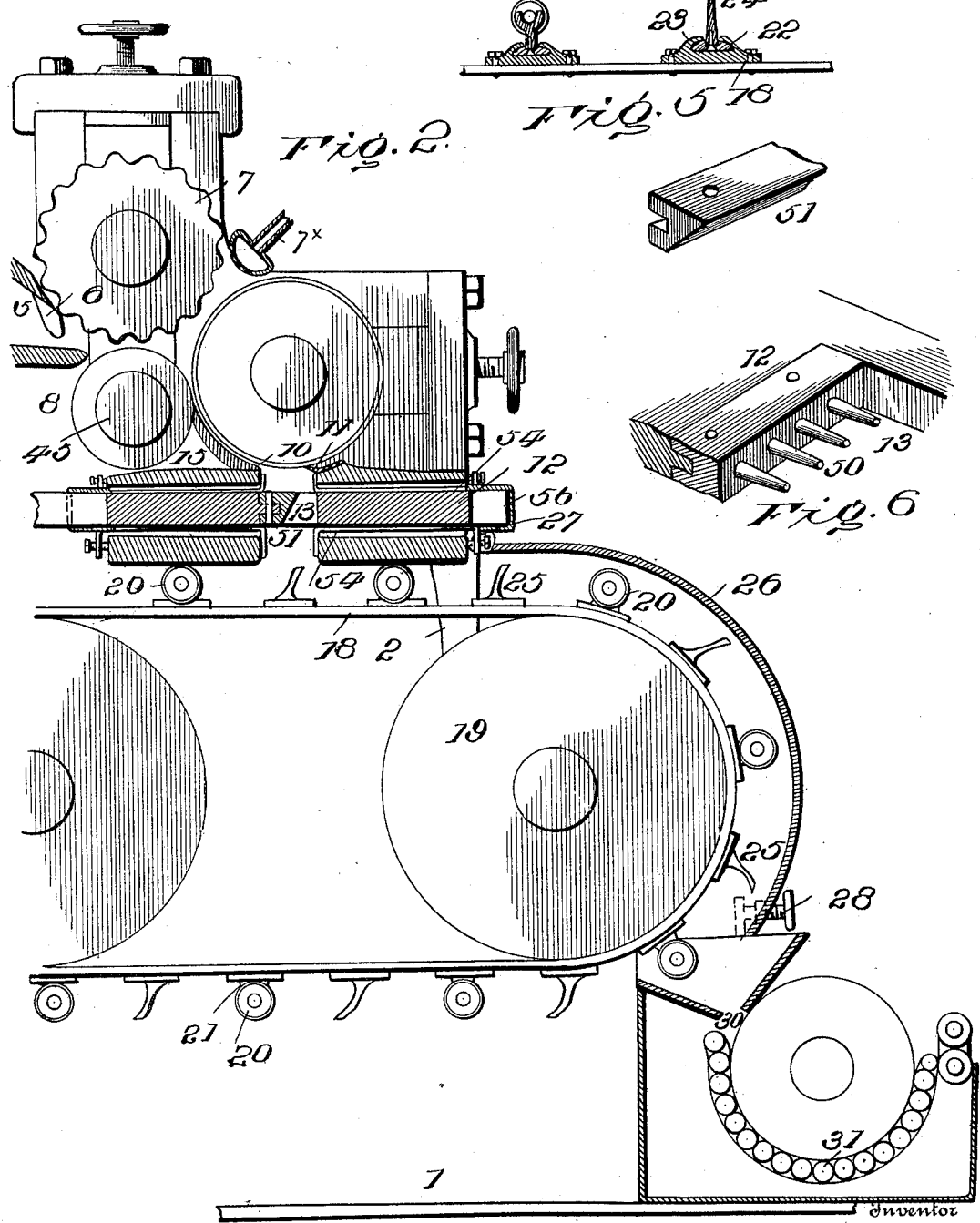

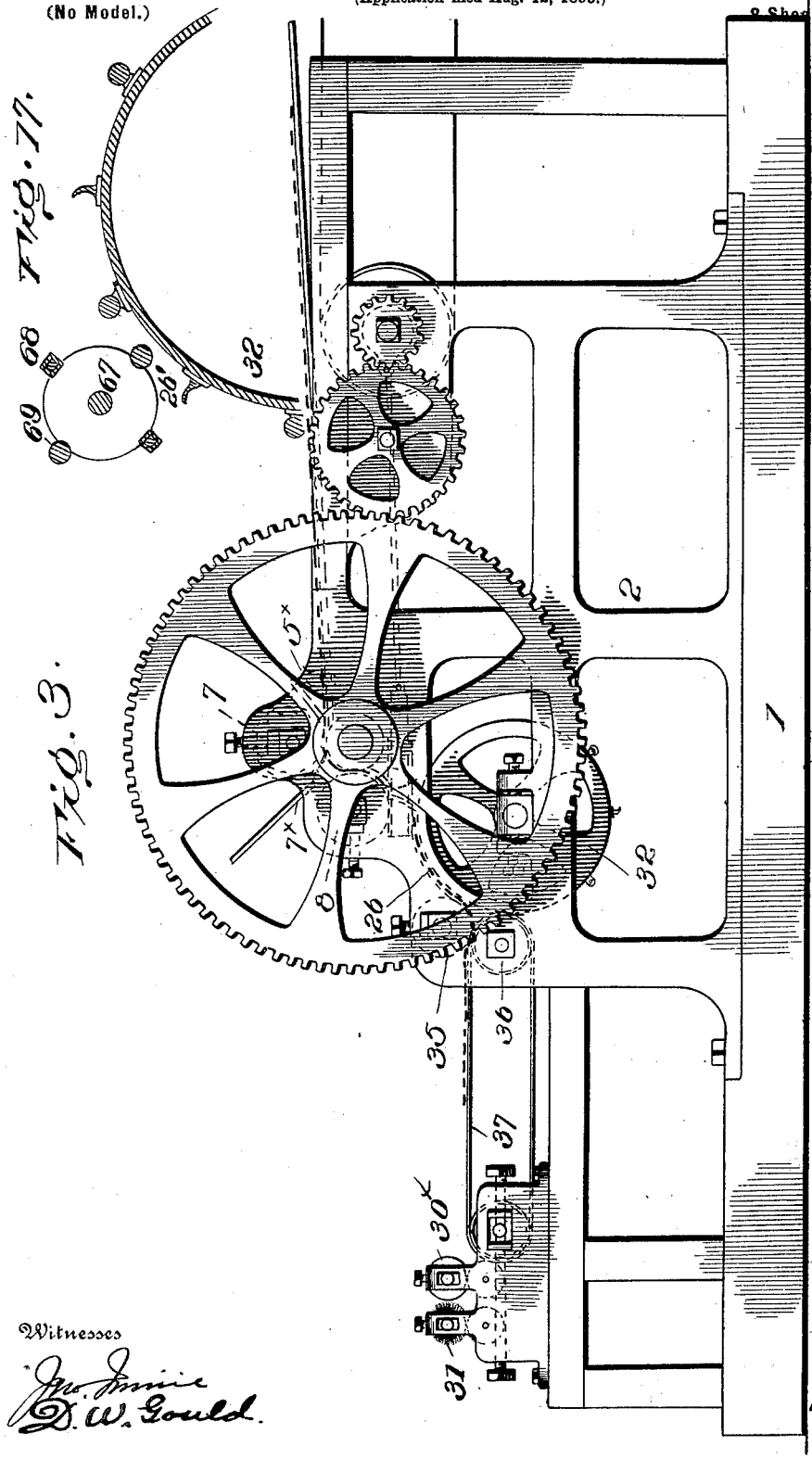

No. 699,638. Patented May 13, 1902.
S. B. ALLISON, Dec'd.
C. A. DORRESTEIN, Administrator.
FIBER SEPARATING MACHINE.
(Application filed Aug. 12, 1899.)
(No Model.) 8 Sheets—Sheet 4.
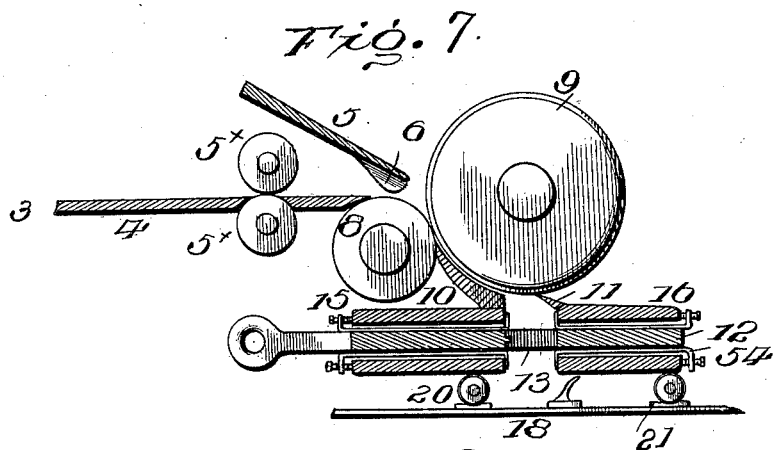
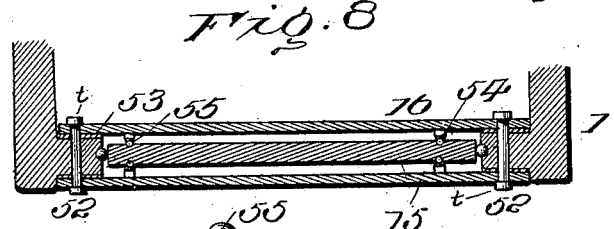
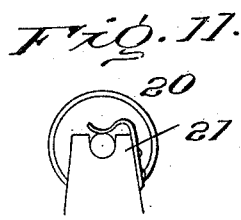
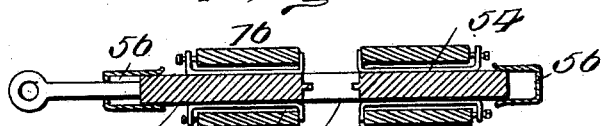
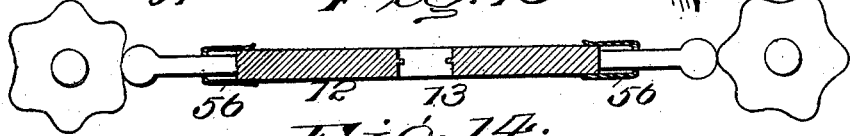
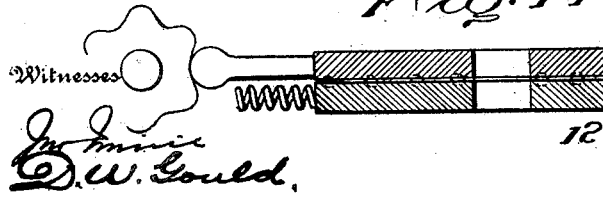

No. 699,638. Patented May 13, 1902.
S. B. ALLISON, Dec'd.
C. A. DORRESTEIN, Administrator.
FIBER SEPARATING MACHINE.
(Application filed Aug. 12, 1899.)

(No Model.) 8 Sheets—Sheet 5.

Witnesses
Inventor
Samuel B. Allison
by
Benj. R. Cadie
Attorney

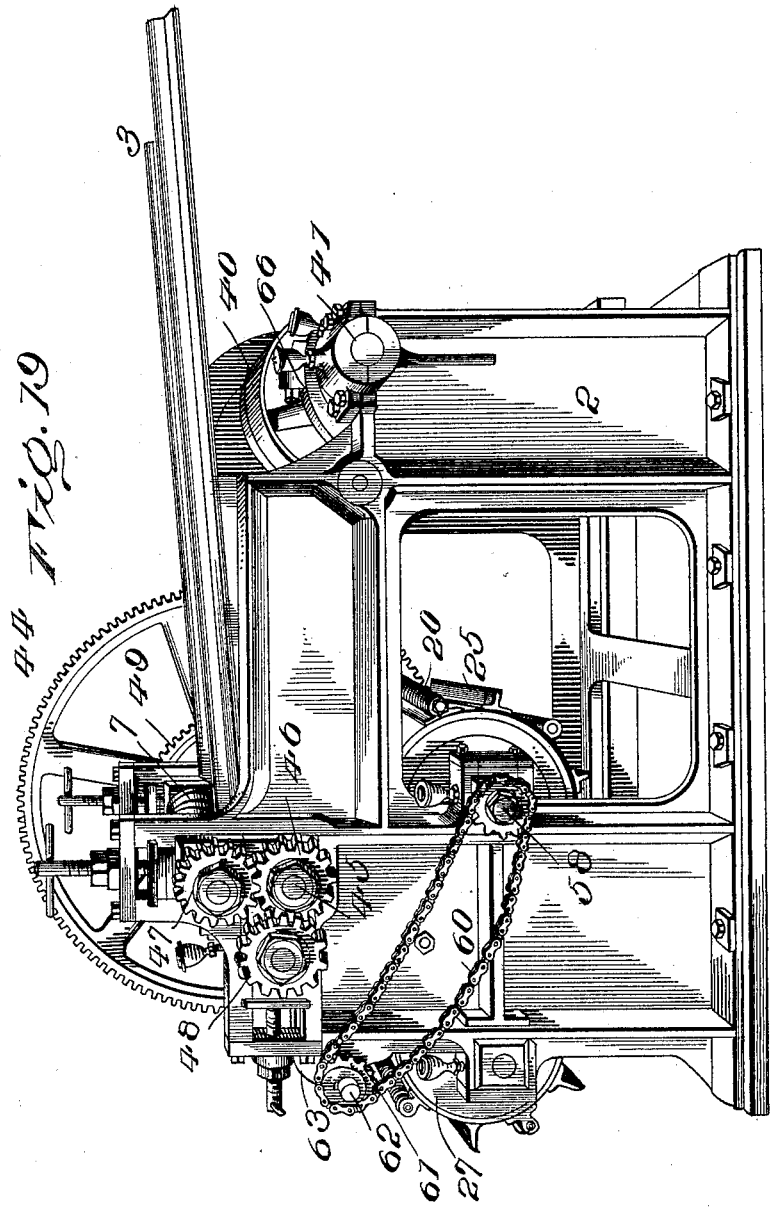

No. 699,638. Patented May 13, 1902.
S. B. ALLISON, Dec'd.
C. A. DORRESTEIN, Administrator.
FIBER SEPARATING MACHINE.
(Application filed Aug. 12, 1899.)
(No Model.) 8 Sheets—Sheet 7.
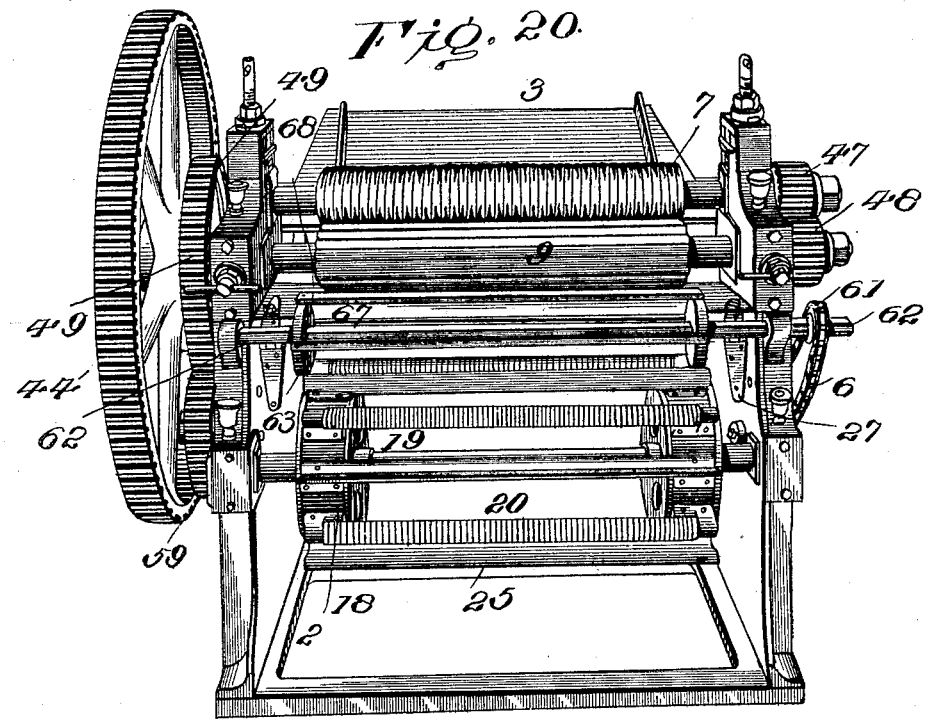
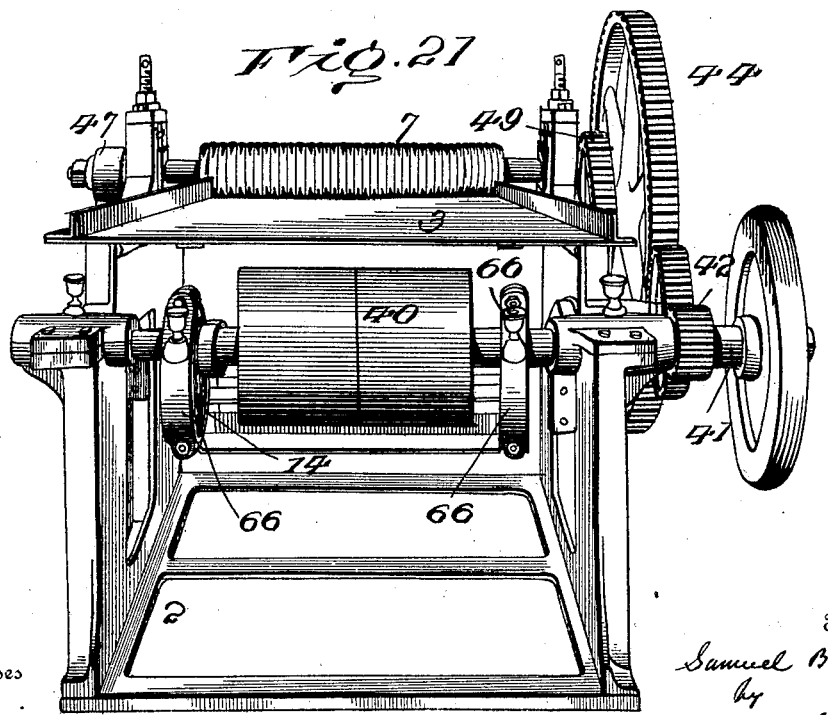

No. 699,638. Patented May 13, 1902.
S. B. ALLISON, Dec'd.
C. A. DORRESTEIN, Administrator.
FIBER SEPARATING MACHINE.
(Application filed Aug. 12, 1899.)
(No Model.) 8 Sheets—Sheet 8.
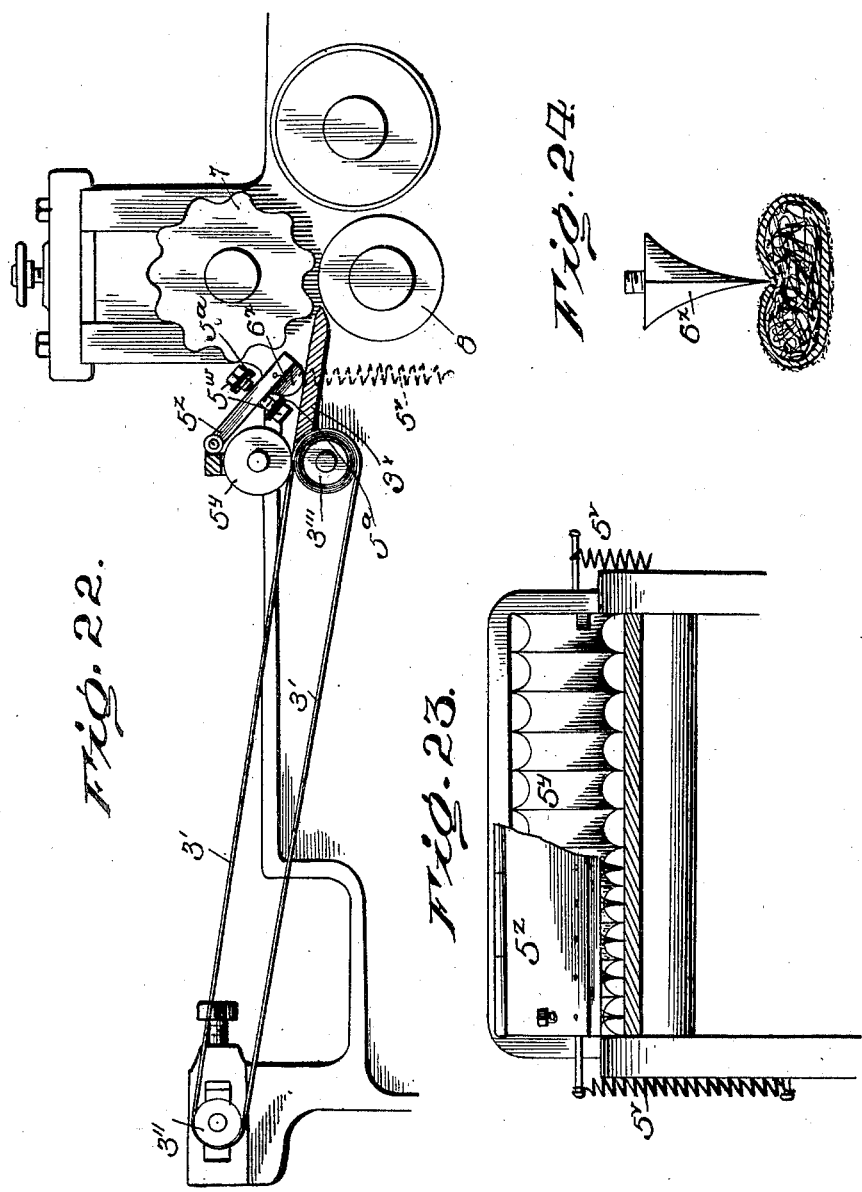

UNITED STATES PATENT OFFICE.

SAMUEL BENJIMAN ALLISON, OF GALVESTON, TEXAS; C. A. DORRESTEIN ADMINISTRATOR OF SAID ALLISON, DECEASED.

FIBER-SEPARATING MACHINE.

SPECIFICATION forming part of Letters Patent No. 699,638, dated May 13, 1902.

Application filed August 12, 1899. Serial No. 727,080. (No model.)

*To all whom it may concern:*

Be it known that I, SAMUEL BENJIMAN ALLISON, a resident of Galveston, in the county of Galveston and State of Texas, have invented certain new and useful Improvements in Fiber-Separating Machines; and I do hereby declare the following to be a full, clear, and exact description of the invention, such as will enable others skilled in the art to which it pertains to make and use the same.

The invention relates to machines for separating the textile fiber of various plants, and has for its objects generally to simplify such machines, perfect their product, and avoid waste.

One important object is to subject the material treated to a continuous action whereby the straying and breaking of fiber and the wrapping of shafts are obviated and the better separation and cleaning of the fiber secured.

It is a further object to effect the aforesaid and other beneficial results by a simple, economical, compact, and portable construction.

The invention consists in the construction hereinafter described and pointed out.

In the accompanying drawings, Figure 1 is a side elevation of the machine, taken opposite the driving mechanism, one side of the frame and a feeding-belt being omitted, a gear-wheel partly broken away, and the base, reciprocating scutcher-bars, hood, and other parts shown in section. Fig. 2 is a similar view of the improved machine having modified details. Fig. 3 is a like view of a simple form of the machine. Fig. 4 is a section of a scraper-carrying belt. Fig. 5 is a broken perspective of a scraper attachment for a reciprocating scutching-bar. Fig. 6 is a similar view of a combing attachment fixed to a bar. Fig. 7 is a partial section of a modified machine. Fig. 8 is a section of a reciprocating scutching-bar. Fig. 9 is an enlarged section of a track for the bar. Fig. 10 is a longitudinal section of the bar. Fig. 11 is an end view of a combing-roll with a spring bearing on its axis. Fig. 12 is a transverse section of a reciprocating scutching-bar and dash-pots. Fig. 13 is a section indicating a scutching-bar driven by cams. Fig. 14 is a like view indicating a pair of scutching-bars actuated by cams. Fig. 15 is a section of a roller, showing a Z plate or ring to obviate the wrapping of the journals by fiber. Figs. 16 and 17 are partial sections showing additional fiber-cleaning devices which may be employed in the machine as represented in Figs. 1 and 3, respectively. Fig. 18 is a side elevation, and Figs. 19, 20, an 21 are perspective views showing the driving mechanism more perfectly. Fig. 22 is a partial side elevation showing improved stem feeding and splitting devices. Fig. 23 is a rear elevation of the same, partly in section. Fig. 24 is a detail indicating the action of a splitting-blade on a ramie-stem.

Referring to the first figure of the drawings, numeral 1 indicates a frame-base, and 2 indicates standards. 3 indicates a feeding-table comprising a folding section hinged to a stationary section at 4. A feeding-chute is denoted by 5. 6 indicates blades fixed in or near the throat of the chute to split the stalks or other material fed to the machine. $5^x$ denotes feeding-rolls, which may, if desired, be used both to feed and flatten the material, and thus prepare it for the splitting-blades. Preferably the small end of stalks will be fed first. The chute terminates as near as practicable to the line of contact between rollers 7 and 8, which draw the material forward into the machine and at the same time break the woody portions of the stalks. To insure these operations, the roller 7 is longitudinally corrugated by preference. $7^x$ (see Figs. 2 and 3) denotes a sprinkling device which may be used when desired. The material is delivered by rollers 7 and 8 to the coaction of rollers 8 and 9, being drawn forward by and crushed between said rollers. This combination of rollers is not broadly new and was described in Patent No. 561,532, granted me under date of July 23, 1896. In the present improvement the roller 8 is made considerably smaller than roller 9 and has its axis situated on a lower level, and the roller 7 is correspondingly situated at a lower level than heretofore. By this construction the distance between the adjacent coacting portions of rollers 7 and 8 and of 8 and 9 is materially reduced, with the effect to reduce the distance through which the material is left free of immediate control and guidance.

A modified form of feeding device and also of a stalk-splitting device is shown in Figs. 22 and 23, in which 3' denotes an endless feeding-belt made, preferably, of sheet-brass or other metal and coacting with an adjustable roller 3'' and a rubber-covered roller 3'''. A grooved guide and feed-roller is denoted by $5^y$. This roller with grooves embraces the stalks and coacts with the belt, the latter having a yielding support, such as a rubber-covered roller. This maintains the parallelism of the stalks and also holds them in alinement with splitting-blades or the like, which are situated in a plane or in planes passing lengthwise of the grooves. It also obviates the overlapping of stems heretofore caused by the usual method of feeding. The grooves may have a depth of three-fourths of an inch and a width of an inch and the roller a diameter of five inches; but these dimensions may be varied. The rings that separate the grooves may be made sharp to better strip the material in some cases; but this is not always essential. The grooved feed-roller may be driven in any suitable manner, and in some cases it may be allowed to rotate freely under the influence of material conveyed by the belt. The roller $5^y$ corresponds in situation and partially in function to the upper roller $5^x$ of Fig. 1. The circumferential grooves which guide the stalks also limit the degree of their flattening.

Circumferentially-corrugated rollers have been used for crushing stalks by lengthwise action thereon. The present improvement in a guide and leaf-stripping roller is characterized by grooves having dimensions substantially such as named that receive the stalk without crushing it and which are separated by circumferential ribs that strip the sides of the stems of leaves. The stalks stripped of their leaves and slitted on one side are opened and flattened by the subsequently acting devices.

The knives or pins $6^x$ are by preference fastened in a hinged board or plate $5^z$, provided with adjusting-screws $5^w$ and are made removable to permit the substitution of others to suit different materials. The knives are held to their work by springs $5^v$. The screws $5^w$ are adjustable through brackets $5^a$, fixed to the frame, and being situated on opposite sides of the plate $5^z$ near its end they constitute adjustable stops for said plate. The springs will normally hold the plate against the lower screw, but in a yielding manner.

As indicated in Fig. 24, there is no coaction of the grooves of rollers $5^4$ to prevent the flattening of the stem. In actual operation and in combination with the roller whose grooves have approximately the width of the stalks the wedge-shaped blades, having, preferably, concave faces, split one side of each stalk and open it, so that rollers 7 and 8 will flatten it without special opening and spreading ribs on said rollers, as heretofore practiced. Said rollers 7 and 8 act in the present combination to both flatten and transversely break the stalks. The knife-plate in the present instance is hinged to the supports of the stem-guiding and leaf-stripping roller.

$3^x$ denotes a stalk supporting and guiding plate extending from the belt-roller 3''' to roller 8 and situated under the splitting-blades, as shown, to coöperate with them in splitting the stalks. The arrangement is such, preferably, that one side of the stalk only is cut, as indicated in Figs. 1, 7, and 24. As shown in Fig. 7, the roller 8 is arranged to hold the stalks against the action of the splitting-blades. The tension of the springs which hold the blades to their work, as illustrated in Fig. 23, can be adapted to insure the partial splitting by cutting one side only of the several stalks.

10 denotes a block or plate provided with a working bed conforming to roller 9 and extending near to a plane passing through the axis of both rollers 8 and 9, substantially as shown, and extending in the opposite direction to a plane tangential to both rollers. The object of this construction is to secure the coaction of roller 9 and bed 10 upon the material as soon as it is forced from rollers 8 and 9 and to continuously act upon it until it can be engaged by and acted upon by other devices in close proximity to roller 9, whereby the material is under continuous action and control. This construction results in less weight and greater compactness of the machine, and, what is more important, it prevents the straying, tangling, and breaking of fiber and the wrapping of shafts otherwise liable to be caused by air-currents and other causes.

The upper edge of plate or bed 10 is made thin and is so placed as to guide material away from roller 8, and it may be made to clean said roller.

A scraper or "doctor" 11 may be provided to guide the material away from roller 9 and toward scutching devices situated closely adjacent the periphery of said roller. The device 11 performs the double function of cleaning roller 9 and turning the material down into the scutching devices. In the present instance said scutching devices comprise a bar 12, provided with a slot 13 for the passage of the material, and suitably reciprocated by an eccentric 14, between fixed bars or plates 15 and 16, each having a slot similar to the slot 13 of the reciprocating bar. The construction, however, is not limited to one such bar, and in practice several may be used. The slots may be lined with bamboo or like material to insure an action as near that of the Chinese hand manipulation as practicable. Instead of actuating the reciprocating blades by eccentrics cams may be employed, as diagrammatically indicated in Figs. 13 and 14, in which 12 denotes reciprocating bars or blades. By preference the cams are formed and arranged to act on alternate bars in succession and in such manner as to move contiguous bars oppositely. By this construction the bars move but half the distance otherwise required, and being actuated by a broken connection and by a succession of circumferentially-disposed cams a high speed of the fiber-beating slot-walls can be obtained with a comparatively low speed of the cam-shafts. In some cases the slots in the reciprocating bars may be provided with hackling-pins 50 (see Fig. 6) for heavy material or with scutching-blades 51 (see Fig. 5) for green material.

In Fig. 8 is shown a preferred form of constructing the reciprocating bar and connections. The slotted plates are adjustably fixed at 52 to the machine-frame and can either be replaced by others having different thicknesses and having slot-walls of different character, or they can by the use of various detachable strips 53, by the means of bolts $t$, be fixed at different distances from each other. The tracks 54 can be correspondingly adjusted by means of thin securing-screws. This adjustment of the fixed bars 16 and 15, though usually very slight, has an important relation to the suitable action on materials of different character and condition to prevent the production of "tow," as happens when the dimensions are unsuitable for the particular case, as when the material is coarse and green and the coacting blades are too closely arranged or the slats of an unsuitable size.

54 denotes tracks for the reciprocating bars. These are detachable, and provision is thus made for substituting other tracks to compensate for wear or to correspond to different reciprocating bars. Further, the reciprocating and coacting bars can thus be separated a little from each other, whereby the friction and the clogging action of gum and refuse are avoided.

55 denotes antifriction rollers or balls bearing on the edges of the reciprocating bar. For this purpose the frame-ribs 52 are provided, and both the ribs and the reciprocating bar are suitably grooved. The tracks 54 on opposite sides of the reciprocating bar are also grooved to receive balls which are arranged in series on opposite sides of the bar. The bar is reciprocated with great rapidity, and heretofore the wear and the clogging have prevented their successful use.

56 denotes air-cushions at each end of the bar to avoid jar and noise. These also aid in returning the bar at each stroke. Springs would serve a similar purpose.

Two reciprocating slotted plates having antifriction-balls between them and oppositely moved by cams, as indicated in Fig. 14, constitute a very efficient device. Obviously each bar need move but half the distance necessary if but one bar is used, and the improvement is not limited to two of such contiguous oppositely-moving bars. These bars may be returned by springs or cams.

Below the reciprocating bars and near to them or near to a stationary coacting slotted bar 16 or other scutching device is an endless belt 18, supported by rollers 19 and driven by them or by one of them. This belt may carry combing-rolls 20, supported to turn in brackets 21, each connected by a recessed or dovetailed base 22, (see Fig. 4,) removably fastened in a similarly-shaped seat 23, fixed to the belt. 24 and 25 denote scraping blades and brushes detachably secured to the belt in like manner. The belt may consist of two endless strips of sheet-brass, preferably, or other material connected by the seat-pieces 23. This provides abundant space for the escape of wood and other refuse by gravity. These various belt-carried devices, or a part of them, or other scutching, combing, scraping, or brushing tools may be employed, as the nature and condition of the material renders appropriate. They coact with a part of bar 15 immediately after the material escapes from the reciprocating bars, no opportunity being afforded for the disarrangement of the sliver and the straying of fiber.

Figs. 18 to 21 illustrate the driving mechanism. 40 denotes a pulley on a shaft 41, and 42 is a pinion on said shaft which drives the large gear 44. On the shaft 45 of wheel 44 is a roller 8. On the opposite end of shaft 45 is a pinion 46, which directly drives pinions 47 and 48 on the shafts of rollers 7 and 9. This roller 9 coöperates with the roller 7, the former being ribbed lengthwise and the latter circumferentially, the construction in this particular being an alternative one.

49 is a gear on shaft 45, which drives a gear 59, that drives a gear 57 on the shaft 58 of the belt-carrying roller. The opposite end of said shaft 52 has a sprocket-wheel, which drives the shaft 62 of roller 63 by the medium of a chain 60 and sprocket-wheel 61.

56 denotes the straps of eccentrics 14. (See Fig. 1.)

The driving-pulley is removable for the substitution of others, it being desirable to vary the speed of the main shaft from about seven hundred to about fifteen hundred revolutions a minute, according to the nature and condition of the material. This and other mechanical details may be varied without departing from the invention.

In the machine illustrated in Fig. 3 a roller 32 is shown, consisting of wheels fixed on a shaft and having rims connected by devices to act on the material.

26 (see Figs. 1, 2, and 3) denotes a hood or guiding-plate conforming to the path of the tools carried by the belt and hinged at 27. 28 (see Figs. 1 and 2) denotes means for adjusting it. The fiber is acted upon under this hood and conducted thereby and by the belt-carried tools to a belt 29, which delivers the fiber out of the machine.

In Fig. 16 is shown a partial section of a skeleton roller 67, coöperating with the belt-carried devices, (denoted by 18.) In Fig. 17 the same roller is indicated in an operative relation to a tool-carrying wheel or roller 32.

The roller 67 may be used either with or without the hood 26. The hinges for such hood, in connection with roller 67, are indicated at 27 in Fig. 20. Said roller may be provided with either rubber-covered bars 68 or with combing-bars 69, or with both, as indicated in drawings. These bars are moved in between and act oppositely to the tools carried by the endless belt and, in coöperation with them, effectually remove refuse. The roller 9 presses the material against the bed 10, while the scutching and combing devices, whether carried by the belt or by the roller, draw it in manner to thoroughly scutch it and comb out the refuse, which falls freely between the bars.

In some cases the delivery-belt 29 may be supplemented by two rollers 30$^x$ (see Fig. 3) to draw the sliver forward and deliver the material between two rotating brushes 31.

In the case of green material a washing and wringing apparatus will be used in connection with the scutching mechanism, as indicated in Fig. 2.

In some cases the construction indicated in Fig. 7 may be employed, in which the roller 7 of the machines illustrated in Figs. 1, 2, and 3 is omitted. In this form the feed-chute will deliver the material as near as practicable to contiguous surfaces of rollers 8 and 9, having, preferably, circumferences of three and twelve inches, respectively.

Brass is a very suitable metal for all parts that act on the material, though the improvement is not limited to that material nor to other details, which may be varied by mechanical skill without departing from the invention pointed out; neither is the machine limited to the manner of gearing the rotating parts, nor in respect to the source of power, nor in respect to speed, though the following relative speeds have been found suitable.

The scutching-bar may be reciprocated from seven hundred to fifteen hundred times a minute; but the speed will be varied according to the nature and condition of the material and other circumstances. The action of the bar on the sliver may have an extent of about one-fourth of an inch each stroke. The rollers 7 and 9 may be run one-eighth faster than roller 8 and at a speed to move the material about eighty-five feet per minute.

The shafts may be provided with collars overlapping similarly-formed parts in the bearing or with Z-shaped guards (see Fig. 15) to exclude dirt and fiber. The bearings will comprise elastic blocks and adjusting devices to permit a slight yielding action and to provide also for adjustment to compensate for wear.

Having thus described my invention, I claim—

1. The combination of a feeding-belt, a feeding-roller having circumferential grooves to embrace and sustain the sides of the stems without splitting or crushing them and maintain their parallelism on the moving belt, knives supported centrally with respect to the grooves and in the paths of the upper sides of the stalks, a hinged support for said knives and springs to hold the knives to their work in a yielding manner.

2. The combination of a feeding-belt with a roller having circumferential grooves to embrace and sustain the sides of the stems without splitting or crushing them and maintain their parallelism on the belt, said belt having an elastic support adjacent said roller.

3. The combination of a feeding-belt, a feeding-roller having circumferential grooves to embrace and sustain the sides of the stems without splitting or crushing them and maintain their parallelism on the moving belt, knives supported centrally with respect to the grooves and in the paths of the upper sides of the stalks, a hinged support for said knives and springs to hold the knives to their work in a yielding manner, said knives having cutting edges inclined to the path of the stalks.

4. The combination of devices for breaking stalks, plain-faced rollers 8 and 9 acting simultaneously and oppositely on the crushed stalks, a block provided with a working face curved to correspond to one of the rollers and situated partly between them and extending from near a plane passing through the axes of both rollers to and terminating near a plane passing through the axis of one of the rollers and transversely to the first-named plane, scutching devices acting on the material immediately adjacent the termination of said face, and a guide 11 situated in close proximity to the termination of the working face, the rollers and scutching device, said guide having a scraping edge contiguous roller 9 and acting oppositely to the direction of the movement of said roller 9 whereby its face is scraped.

5. In a machine for separating fiber, in combination with a slotted reciprocating bar to beat the fiber, a fixed bar correspondingly slotted having tracks bearing on the face of the reciprocating bar to guide said bar in a constant plane and receive the wear, said tracks being removable to provide for renewal.

6. In a machine for separating fiber, in combination with a slotted reciprocating bar to beat the fiber, a fixed bar correspondingly slotted having tracks bearing on the face of the reciprocating bar to guide said bar in a constant plane and receive the wear, said tracks being removable to provide for renewal, and the fixed bar being adjustable.

7. In a machine for separating fiber, the combination of a fixed slotted plate and a reciprocating slotted bar to beat the fiber, said fixed plate having tracks provided with ball-bearings for the recprocating bar, ball-bearings between the edges of the reciprocating bar and the frame, and said frame.

8. In a machine for separating fiber, a beating-bar, means for reciprocating it, and cushions at its ends to obviate jar and noise.

9. In a machine for separating fiber, a bar in combination with actuating devices having a broken connection with the bar alternately acting on each end of the bar to positively reciprocate it.

10. In a machine for separating fiber, the combination of a reciprocating scutching-bar, a coöperating bar, and mechanism for actuating fiber-cleaning tools, and the tools, said tools being carried lengthwise the lower of the two scutching-bars in proximity thereto to coact with it to clean the fiber.

11. In a machine for separating fiber, the combination of a reciprocating scutching-bar, a coöperating bar, and mechanism for actuating fiber-cleaning tools, and the tools, said tools being carried in proximity to the lower of the two scutching-bars and lengthwise thereof to coact with it to clean the fiber, and the hood constituting a continuation of a bar and having a curved surface conforming to the path of the tools.

12. In a machine for separating fiber, the combination of a reciprocating scutching-bar, a coöperating bar, and mechanism for actuating fiber-cleaning tools, and the tools, said tools being carried in proximity to the lower of the two scutching-bars and lengthwise thereof to coact with it to clean the fiber, and the hood constituting a continuation of a bar, said hood having a curved surface conforming to the path of the tools, and made adjustable to and from the path.

13. In a machine for separating fiber, a scraper for the material, and an elastic holder for said scraper, said holder consisting of an elastic socketed block.

14. The splitting-blades, in combination with means for feeding and guiding the material in parallel lines, and means for holding both the guides and the blades to their work in a yielding manner.

In testimony whereof I have signed this specification in the presence of two subscribing witnesses.

SAMUEL BENJIMAN ALLISON.

Witnesses:
FRED W. FICKETT,
R. WAVERLEY SMITH.